July 6, 1943.  J. J. O'BRIEN  2,323,725
GRINDING TOOL
Filed March 20, 1942

INVENTOR,
John J. O'Brien,
BY
ATTORNEY.

Patented July 6, 1943

2,323,725

UNITED STATES PATENT OFFICE 2,323,725

GRINDING TOOL

John J. O'Brien, East Paterson, N. J.

Application March 20, 1942, Serial No. 435,507

4 Claims. (Cl. 253—3)

There is a known hand implement used for grinding and other purposes which, generally stated, includes an elongated housing and a rotor journaled in and coaxially with the housing and having a turbine therein, the housing providing for passage therethrough of fluid under pressure for driving the turbine and hence the rotor, which latter protrudes from the housing and at its protruding end is equipped with means to hold the actual tool. As heretofore devised the tool is more or less involved in construction and expensive to manufacture and access to its parts for repairs, adjustment and lubrication is difficult; further, the driving fluid is so directed through the implement that foreign particles carried by the fluid and accumulating at the bearings due to presence of lubricant cause undue wear of the bearings.

This invention contemplates an implement of this class which is simple in construction, whose parts are readily accessible for repairs, adjustment and lubrication, and which provides for such conduct therethrough of the driving fluid as to isolate it from the rotor bearings. In the preferred form said bearings are of the thrust-type, desirably of the ball-bearing class, and so arranged and constructed that it is possible readily to re-set them when from wear or other cause looseness of the rotor ensues.

In the accompanying drawing, showing an example of the improved implement,

Figure 1:
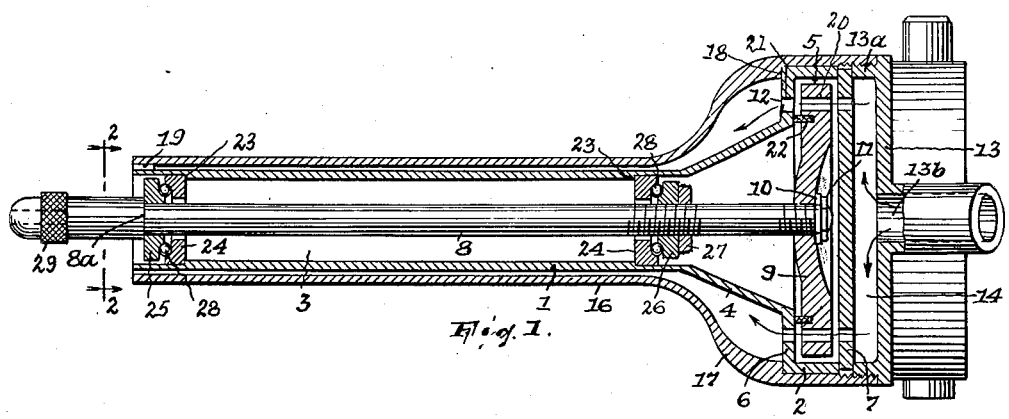
Fig. 1 is a view thereof mainly in longitudinal section but partly in side elevation.

An elongated housing is formed with a tubular portion 1 and an enlarged portion or head 2 concentric with said tubular portion. The tubular portion may be flared, as at 4, so that the bore 3 is gradually enlarged to join the space 5 of said head, which exists between walls 6—7 perpendicular to the axis of the bore.

In and coaxial with the tubular portion of said housing is journaled in suitable bearings, as will appear, the shaft 8 of a rotor having a turbine 9 fixed on the shaft in the form of a disk, the turbine occupying said space and existing between said walls. The wall 6 is annular, so that the shaft projects therethrough to carry the turbine, which is secured on the end of the shaft by a nut 10 and lock-nut 11.

It being assumed that fluid under pressure exists at the relatively outer side of wall 7, said wall and the turbine have means, as will appear, to conduct such fluid into impelling relation to and past the turbine and to an outlet 12 or series of outlets coaxial with the rotor and leading from said space 5 and arranged in the wall 6 and to discharge exteriorly of the bore 3.

In the example, the wall 7 is not an integral part of the head but forms a partition that is clamped, as will appear, between said head, which in effect is a flange of wall 6, and the flange 13a of a closure or cap 13 having a fluid delivery port 13b discharging to the pressure chamber 14 which exists between wall 7 and the closure and circumscribed by flange 13a.

Figure 2:
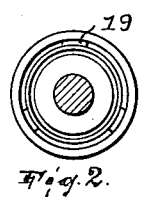
Fig. 2 is a section on line 2—2, Fig. 1.

In this example, said housing is completed by a shell including a tubular portion 16 surrounding tubular portion 1 and an enlarged portion or head 17, this shell being not integral with the shell comprising portions 1 and 2 but separately formed so that it may coact with the closure to clamp between it and the head 2, which it receives and snugly fits, the (separable) wall 7. To this end head 17 has an internal shoulder 18 and at its end is interiorly threaded. Thus its shoulder abuts head 5 and the threading is engaged with threading provided on the closure. Between the free ends of the tubular portions 1 and 16 are spacers 19 maintaining them in fixed relation to each other and spaced apart as shown in Fig. 2.

Figure 3:
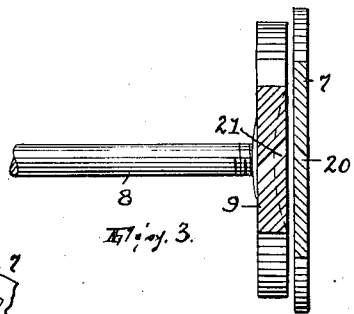
Fig. 3 shows a part of the rotor and diaphragm 7 in section in a plane chordal with respect to said diaphragm and the turbine.
Figure 4:
Fig. 4 is a fragmentary side elevation of said diaphragm.

The means to conduct fluid into impelling relation to and past the turbine and to the outlets 12 in this example consists of ports 20 and 21 arranged in the wall or partition 7 and turbine, each in a circular series concentric with and preferably of the same radius as the series of outlets 12: see Fig. 4, which shows the ports of wall 7 by way of example. The ports of the turbine and said wall are so arranged that those of at least one set are in bias relation to those of the other one set are in bias relation to the axis of rotation of the rotor, viewing such turbine or wall in a chordal section thereof (Fig. 3); as the ports are here shown arranged air under pressure at the outer side of wall 7 and escaping at the ports 20 will impel the rotor clockwise as viewed from the right in Fig. 1. Such air, escaping at the outlets 12, will then be delivered from the housing via the passage existing between the shells 1 and 16, thus avoiding foreign particles being delivered to the bearings of the shaft of the rotor. To exclude air escaping at the turbine ports from access to said bearings there may be provided between the turbine and wall 6 a felt ring or other sealing annulus 22 set in one and bearing continuously against the other of these parts.

The rotor is journaled as follows: Each end of the tubular portion 1 is counterbored to provide shoulders at 23. Jammed into the counter-bores are fixed races or thrust-bearings 24. Fast on the outer end of the shaft of the rotor and preferably abutting an inwardly facing shoulder 8a thereon is a race or thrust-bearing 25 and screwed on the shaft inward of the inner race or thrust-bearing 24 is a race 26, backed by a locknut 27 screwed on the shaft. Between the races 25—26 and the races 24 respectively adjoining them are balls 28. The construction is thus such that on removing the closure, partition and turbine access may be had to the nut 27 and race 26 for effecting such thrustwise adjustment as may be necessary to eliminate endwise play of the rotor. On the left-hand end of the rotor shaft is provided any conventional tool-holder 29.

Having thus fully described my invention, what I claim is:

1. The hereindescribed implement including an elongated housing which for the major portion of its length is formed slender and has one end portion enlarged, said housing having a bore extending longitudinally therethrough from end to end thereof and which within said end portion provides a cavity of greater diameter than the remainder of the bore and said housing having a wall partitioning off a space of the cavity from the open end of the latter, a shell fixed to and surrounding the housing from approximately end to end thereof and forming with the housing a passage closed at one end by the enlarged portion of the housing and open at the other end, and a rotor journaled in and coaxial with the bore and having a turbine in said space, said enlarged portion of the housing having an outlet from said space to the passage and said wall and the turbine having means to conduct into and past the turbine and to the outlet fluid existing under pressure at the relatively outer side of said wall.

2. The hereindescribed implement including an elongated housing which for the major portion of its length is formed slender and has one end portion enlarged, said housing having a bore extending longitudinally therethrough from end to end thereof and which within said end portion provides a cavity of greater diameter than the remainder of the bore and said housing having a wall partitioning off a space of the cavity from the open end of the latter, a shell including a slender portion and a relatively enlarged head respectively surrounding said slender and enlarged portions of the housing and forming therewith a passage closed at one end by said enlarged portion but open at its other end, a closure coacting with said head to clamp said enlarged portion of the housing and said wall between them and opposed to the relatively outer side of and forming a pressure chamber with said wall and having a fluid inlet leading to said chamber, and a rotor journaled in and coaxial with the bore and having a turbine in said space, said enlarged portion of the housing having an outlet from said space to the passage and said wall and the turbine having means to conduct into and past the turbine and to the outlet fluid existing under pressure in said pressure chamber.

3. The herein-described implement including, in combination, inner and outer generally tubular and coaxial shells providing between them a passage open at one end of the outer shell, a closure opposed to one end of the inner shell, a wall between the closure and said end of the inner shell, one of the parts formed by the closure and wall having means spacing them apart and said closure having a fluid inlet to the space between it and the wall, a rotor journaled in and coaxial with the inner shell and having a turbine at the side of the wall remote from said space, said inner shell having, at the side of the turbine remote from the wall, a fluid outlet leading from said space to the passage, and the wall and turbine having means to conduct into impelling relation to and past the turbine and to the outlet fluid under pressure supplied to said space, the outer shell having its other end embracing the adjoining end of the inner shell and coacting with the closure to clamp together such inner shell and said wall.

4. The herein-described implement including, in combination, an elongated housing having a tubular bore and at one end a head providing a space of greater diameter than and forming a continuation of the bore and formed open at said end, a wall removable from said open end partitioning off the latter from said space, a rotor including a shaft in and coaxial with the bore and a turbine on the shaft and in said space and removable toward said open end from the shaft, said housing having an outlet from said space to the atmosphere and said wall and turbine having means to conduct fluid into impelling relation to and past the turbine and to the outlet, thrust-bearings on the shaft within said bore, that one of said thrust-bearings which adjoins said open end of the housing being adjustable toward the other, and thrust-bearing means fixed in the bore between and coactive with said thrust-bearings.

JOHN J. O'BRIEN.